US012789887B2

(12) United States Patent
Wilson-Jones et al.

(10) Patent No.: US 12,789,887 B2
(45) Date of Patent: Nov. 10, 2026

(54) DUAL MOTOR DRIVE ASSEMBLY

(71) Applicant: ZF Automotive UK Limited, Solihull (GB)

(72) Inventors: Russell Wilson-Jones, Stratford upon Avon (GB); Mark Anthony Wilkes, Kings Norton (GB)

(73) Assignee: ZF Automotive UK Limited, Solihull (GB)

(*) Notice: Subject to any disclaimer, the term of this patent is extended or adjusted under 35 U.S.C. 154(b) by 577 days.

(21) Appl. No.: 18/363,911

(22) Filed: Aug. 2, 2023

(65) Prior Publication Data

US 2024/0051600 A1 Feb. 15, 2024

(30) Foreign Application Priority Data

Aug. 9, 2022 (GB) ..................................... 2211651

(51) Int. Cl.
*B62D 5/04* (2006.01)
*B62D 1/20* (2006.01)
*B62D 6/00* (2006.01)

(52) U.S. Cl.
CPC ............ *B62D 5/0463* (2013.01); *B62D 1/20* (2013.01); *B62D 6/008* (2013.01)

(58) Field of Classification Search
CPC .. B62D 5/0463; B62D 5/0403; B62D 5/0421; B62D 5/005; B62D 1/20; B62D 6/008;
(Continued)

(56) References Cited

U.S. PATENT DOCUMENTS 6,176,341 B1 * 1/2001 Ansari .................. B62D 6/008 180/402
6,345,681 B1 * 2/2002 Hackl .................... B62D 5/001 180/443

(Continued)

FOREIGN PATENT DOCUMENTS

JP 2003033084 A 1/2003
JP 2013009532 A 1/2013

*Primary Examiner* — George C Jin
(74) *Attorney, Agent, or Firm* — Kristin L. Murphy

(57) ABSTRACT

A dual motor drive assembly, for a handwheel actuator assembly of a vehicle, comprises a housing, a shaft rotatably mounted to the housing, a first gear connected to and configured to rotate with the shaft, first and second motors, each having an output driving a respective output gear, the output gears being engaged with the first gear, a torque allocation arrangement for allocating torque demands to each of the first and second motors according to a first and second mode, wherein in the first mode the torque demand allocated to the first motor follows a first profile and the torque demand allocated to the second motor follows a second profile, wherein the first and second profiles represent defined relationships between a total torque demand and the torque demand allocated to one of the first and second motors, wherein in the second mode the torque demand allocated to the first motor follows the second profile and the torque demand allocated to the second motor follows the first profile, further comprising a switching arrangement operable to switch the torque allocations between the first and second mode.

20 Claims, 11 Drawing Sheets

(58) Field of Classification Search
CPC .......... B62D 5/006; H02K 7/10; H02K 11/25; H02K 11/33
See application file for complete search history.

(56) References Cited

U.S. PATENT DOCUMENTS

| | | | | |
|---|---|---|---|---|
| 6,484,839 | B2 * | 11/2002 | Cole | B62D 7/20<br>180/402 |
| 9,079,604 | B2 * | 7/2015 | Di Giusto | B62D 5/046 |
| 2019/0386590 | A1 | 12/2019 | Koike | |

* cited by examiner

DUAL MOTOR DRIVE ASSEMBLY

CROSS-REFERENCE TO RELATED APPLICATION

This application claims priority to GB Priority Application No. 2211651.1, filed Aug. 9, 2022, the disclosure of which is incorporated herein by reference in its entirety.

TECHNICAL FIELD

This disclosure relates to a dual motor drive assembly, for example, but not exclusively, suitable for use in a handwheel actuator (HWA) assembly of a vehicle.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver moves and the steered wheels with movement of the hand wheel by the driver being detected by a sensor and the motor being driven in response to the output of the sensor to generate a force that steers the road wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor coupled to the steering wheel. The secondary motor provides the driver with the appropriate resistance and feedback in response to specific user inputs at the steering wheel to mimic the feel of a conventional steering system.

In a steer-by-wire system, a malfunction or failure of a portion of the assembly may impair the ability to steer the vehicle. As a result, it is desirable to provide the assembly with structure for providing at least a temporary fail-safe operation. US 2006/0042858 A1 discloses steering apparatus including a steering assembly that includes a handwheel actuator. The handwheel actuator includes a steering column for supporting a steering wheel, a gear mechanism and two motors, each for providing a torque to the steering column.

GB 2579374A discloses a steering column assembly for use with a steer-by-wire hand wheel actuator. This assembly utilises a similar dual motor drive system that comprises first and second motors, each having an output driving a respective output gear. Each output gear drives a first gear which is connected to and configured to rotate a shaft of the steering wheel to provide a sensation of road feel to the driver. The dual motor drive system is used to reduce gear rattle by driving both motors at the same time to apply opposing torques to the steering column. Having two motors also provides for some redundancy in the system.

When a driver is steering a vehicle, the HWA will tend to spend most of its life operating with a low feedback torque at, or close to, the straight-ahead position.

In this condition a twin-worm system will allocate a bias torque to both motors to hold the worms in contact with one of the flanks of the wormwheel teeth. This biasing torque helps prevent backlash and also provides an improved "road feel" to the user.

A typical torque allocation scheme will always energise the first motor in one particular direction and the second motor in the opposite direction. If torque is applied in one direction, the first motor torque is increased. If torque is applied in the opposite direction, the second motor torque is increased. In both directions, the worms continue to bear on the same flanks of the wormwheel. Since a large proportion of the operating life is spent operating at near the straight-ahead position, the wormwheel flanks of a few teeth will experience the most wear.

SUMMARY

The present disclosure seeks to ameliorate the problems associated with conventional motor assemblies.

In accordance with a first aspect of the present disclosure, a dual motor drive assembly comprises:

- a housing;
- a shaft rotatably mounted with respect to the housing;
- a first gear connected to and configured to rotate with the shaft;
- first and second motors, each having an output driving a respective output gear, the output gears being engaged with the first gear;
- a torque allocating arrangement for allocating torque demands to each of the first and second motors according to a first mode and a second mode,
- wherein in the first mode the torque demand allocated to the first motor follows a first profile and the torque demand allocated to the second motor follows a second profile,
- wherein the first and second profiles represent defined relationships between a total torque demand and the torque demand allocated to one of the first and second motors,
- wherein in the second mode the torque demand allocated to the first motor follows the second profile and the torque demand allocated to the second motor follows the first profile, and
- further comprising a switching arrangement operable to switch the torque allocations between the first mode and the second mode.

Within a low torque region, the first and second motors may each apply an opposing torque to the first gear, in order to control mechanical backlash. Outside of the low torque region, the first and second motors may each apply a torque to the first gear in a same direction. The low torque region may define a torque range from a first point to a second point, the first and second points each representing torques with opposite directions and having magnitudes not greater than the maximum operating torque of either the first or second motors. The first point may be defined as the crossover point at which a rotational direction of a motor following the first profile reverses. The second point may be defined as the crossover point at which a rotational direction of a motor following the second profile reverses.

Advantageously, periodically switching torque directions may more evenly distribute the wear on the gearbox in the low torque region.

The first gear connected to and configured to rotate with the shaft may comprise a wormwheel. The wormwheel may be operatively connected to a driver's steering wheel via the shaft.

The first motor may be operably connected to a first worm. The second motor may be connected to a second worm.

The first worm may be operably connected to an opposing side of the wormwheel gear than the second worm. In this way, the first and second motors may be configured to provide a torque to the wormwheel through the worms.

The switching arrangement may be configured to switch between the first mode and the second mode at any suitable time. The dual motor drive assembly may comprise an electronic control unit, or any other suitable electronic controller, that is suitable for controlling the switching arrangement.

The dual motor drive assembly may be used in a hand heel actuator (HWA) assembly of a vehicle The switching arrangement may be configured to switch the torque allocations between the first mode and the second mode, and vice versa, after operating for a certain period. The period may be a fixed or randomised time period. The period may be determined by an amount of operation, for example an angular distance travelled by the steering wheel or distance travelled by the vehicle.

The period may be configured such that, over the life of the vehicle, approximately half the time is spent in each of the allocation modes in order to distribute the wear evenly.

The switching arrangement may be configured to switch the torque allocations between the first mode and the second mode, and vice versa, when the system is powered-up at the start of a journey. Switching the allocation mode at the start of the journey may occur before the motors apply torque to the first gear connected to the shaft. The torque allocations may be switched at the start of every journey or every time the system is powered up. The torque allocations may not be switched at the start of every journey or every time the system is powered up. The torque allocations may be switched after a fixed number of journeys, such as every two, three, four five or more journeys, for example.

The torque allocations may be switched at the start of a journey after a pre-determined distance has been travelled by the vehicle. For example, any number of journeys may be completed without the torque allocations being switched until a pre-determined distance has been travelled by the vehicle and then the torque allocations may be switched at the start of the next journey. The torque allocations may then be switched each time the vehicle has again travelled the pre-determined distance.

The torque allocations may be switched at the start of a journey after a pre-determined angular travel of the hand-wheel has been accumulated. The torque allocations may then be switched again each time the pre-determined angular travel of the handwheel has been accumulated again.

The electronic control unit may include a non-volatile memory that is operable to store the information needed to determine the torque allocation to be used for the next journey. When a journey is started, the current allocation may be read from the non-volatile memory. The allocation mode stored in the non-volatile memory may then be swapped to the alternate allocation mode ready for the next journey or powering up of the system.

The switching arrangement may be configured to switch the torque allocations between the first mode and the second mode, and vice versa, when the motors are both operating in the same direction. Both motors may be operating in the same direction, and therefore applying cooperating torque to the first gear and shaft, at high torque when operating above the cross-over point.

The switching arrangement may be configured to switch between the first and second operating mode only at total demand torques at which the first profile and the second profile have equal torques, including at times where the torque applied is zero. This may prevent the motor torque directions of both the first and second motors from instantaneously reversing and prevent a noticeable transient on the steering wheel.

The switching arrangement may be configured to switch between the first and second operating mode only at total demand torques at which the magnitude of the difference between the torques of first profile and the second profile is less than a pre-defined value. This may prevent the motor torque directions of both the first and second motors from instantaneously reversing and prevent a noticeable transient on the steering wheel. The pre-defined value may correspond to a torque difference at which the switching does not produce a noticeable transient through the shaft.

In high output torque scenarios, both the first and second motor may be configured to provide equal torque output. The point at which the motors go from outputting different torque value to outputting an equal torque may be described as a blending point. Switching the torque allocations between the first mode and the second mode, and vice versa, above the blending point may help achieve a smooth switch between the allocation modes.

In an example, a reference torque demand may be used to calculate the first profile and the second profile. A Schmitt trigger may be used to detect when the torque demand exceeds a demand threshold.

The threshold may be set at value equal or greater than the point at which the output torque from the first and second motor is equal. At this threshold, the allocated torques may switch from the first mode to the second mode.

Any of the above switching arrangements for switching from the first mode to the second mode may be combined. For example, a Schmitt trigger may be used to detect when the torque demand exceeds a demand threshold in order to initiate a switch from a first mode to a second mode, but this may only be operable after a pre-determined period of time, or after the vehicle has covered a pre-determined distance, or after a pre-determined duration of use of the vehicle.

According to a second aspect of the disclosure there is provided a method of operating a dual motor drive assembly, the dual motor drive assembly comprising:

a housing;

a shaft rotatably mounted with respect to the housing;

a first gear connected to and configured to rotate with the shaft;

first and second motors, each having an output driving a respective output gear, the output gears being engaged with the first gear; and a torque allocating arrangement for allocating torque demands to each of the first and second motors according to a first mode and a second mode wherein the method comprises the steps:

allocating torque demands to the first and second motors in accordance with a first mode wherein the torque demand allocated to the first motor follows a first profile and the torque demand allocated to the second motor follows a second profile, using a switching arrangement to switch the torque allocations between the first mode and the second mode, wherein in the second mode the torque demand allocated to the first motor follows the second profile and the torque demand allocated to the second motor follows the first profile.

The dual motor drive assembly is suitable for use in a handwheel actuator assembly of a vehicle.

The switching arrangement may switch the torque allocations between the first mode and the second mode, and vice versa, after operating for a pre-determined period.

The switching arrangement may switch the torque allocations between the first mode and the second mode, and vice versa, when the system is powered-up at the start of a journey.

The switching arrangement may switch the torque allocations between the first mode and the second mode, and vice versa, when the motors are both operating in the same direction.

The person skilled in the art will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DETAILED DESCRIPTION

Figure 1:
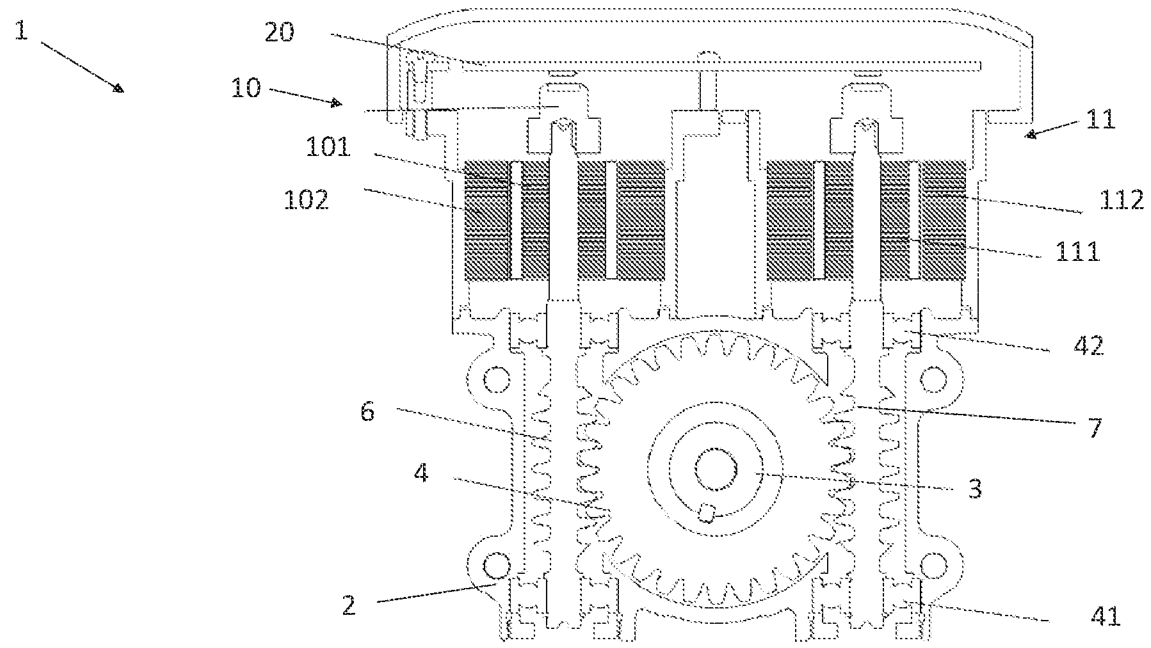
FIG. 1 shows an exemplary arrangement of a dual motor drive assembly according to a first aspect of the disclosure.

FIG. 1 shows a dual motor drive assembly, suitable for use in a handwheel actuator (HWA) assembly of a vehicle, according to a first aspect of the disclosure. The drive assembly 1 includes a first motor 10 with a rotor 101 and stator 102, and a second motor 11 with a rotor 111 and stator 112, the first motor 10 being connected to a first worm gear 6 and the second motor 11 being connected to a second worm gear 7. Each worm gear 6, 7 comprises a threaded shaft arranged to engage with a wormwheel gear 4 connected to a steering column shaft 3 such that torque may be transferred from the worm gears 6, 7 to the wormwheel gear 4 connected to the steering column shaft 3. The wormwheel gear 4 is operatively connected to a driver's steering wheel (not shown) via the steering column shaft 3. In this example, each of the two motors 10, 11 are brushless permanent magnet type motors and each comprise a rotor 101, 111 and a stator 102, 112 having many windings surrounding regularly circumferentially spaced teeth. The arrangement of the two motors 10, 11, the shaft 3, the worm gears 6, 7 and the wheel gear 4 together form a dual motor electrical assembly.

Each of the two motors 10, 11 are controlled by an electronic control unit (ECU) 20. The ECU 20 controls the level of current applied to the windings and hence the level of torque that is produced by each motor 10, 11.

In this example, the two motors 10, 11 are of a similar design and produce a similar level of maximum torque. However, it is within the scope of this disclosure to have an asymmetric design in which one motor 10, 11 produces a higher level of torque than the other 10, 11.

One of the functions of a handwheel actuator (HWA) assembly is to provide a feedback force to the driver to give an appropriate steering feel. This may be achieved by controlling the torque of the motors 10, 11 in accordance with signals from the handwheel actuator (such as column angle) and from other systems in the vehicle (such as vehicle speed, rack angle, lateral acceleration and yaw rate).

The use of two motors 10, 11 is beneficial in eliminating rattle. If a single electric motor were instead used in a torque feedback unit, the motor may be held in locked contact with the gearing by a spring. However, in certain driving conditions the action of a spring is not sufficiently firm, which allows the gears to "rattle" during sinusoidal motions or sharp position changes of the steering column.

Use of two motors 10, 11 which can be actively controlled (as in the present embodiment) ameliorates the problems associated with use of a single motor. In this arrangement, both motors 10, 11 are controlled by the ECU 20 to provide torque feedback to the steering column and to ensure that the worm gears 6, 7 of both motors 10, 11 are continuously in contact with the wormwheel gear 4, in order to minimise rattle. The use of two motors 10, 11 in this way also allows active management of the friction and thereby the feedback force to the driver.

As shown in FIG. 1, the motors 10, 11 are received in and secured to a transversely extending two-part extension of a housing 2. The worm gear 6, 7 of each motor is supported relative to the housing by two sets of bearings. A first set of bearings 41 supports a first end of each worm gear 6, 7 distal their respective motor 10, 11 while a second set of bearings 42 supports a second end of each worm gear 6, 7 proximal their respective motor 10, 11.

Figure 2:
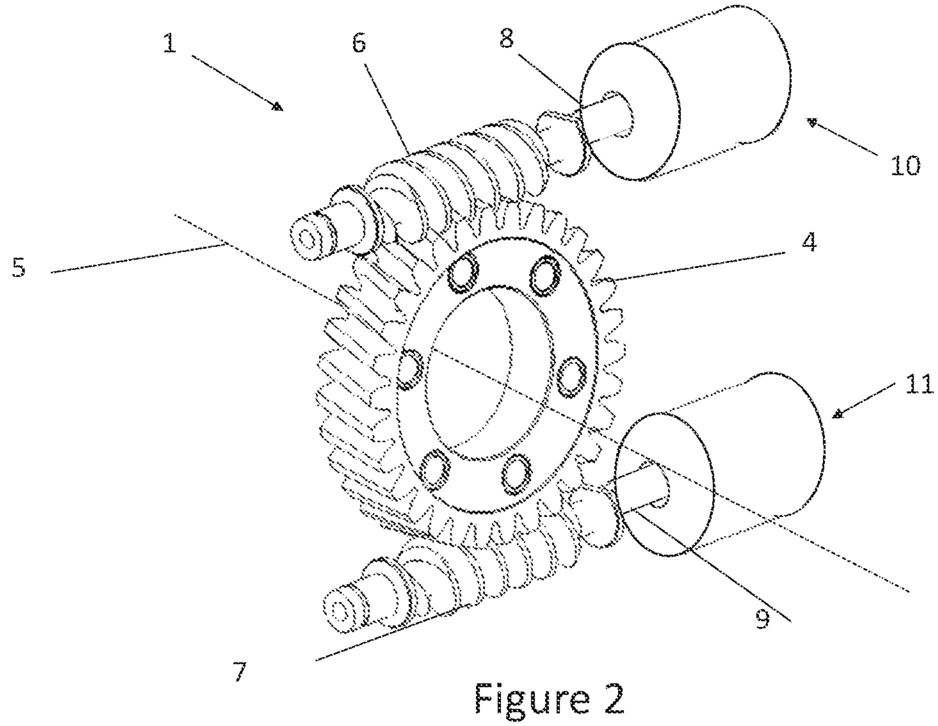
FIG. 2 shows a part of the dual motor drive apparatus of FIG. 1 with the gearbox housing removed to better show the gears and the motor connection to the gears.

FIG. 2 shows an axis of rotation of shaft 3 marked using a dashed lime 5, extending perpendicularly through the wormwheel gear 4. The periphery of the wormwheel gear 4 is formed as a worm gear which meshes with each of two identical worm gears 6, 7 located on opposite sides of the longitudinal axis 5 of the shaft 3. Each worm gear 6, 7 is connected to the output shaft 8, 9 of a respective electric motor 10, 11.

The axes of the output shafts 8, 9 of the two motors 10, 11 are arranged perpendicularly to the rotational axis of the shaft 3 and the axes of the two motors may also be inclined with respect to each other, to reduce the overall size of the assembly.

The motors 10, 11 are controlled by the electronic control unit (ECU) 20 such that at low levels of input torque applied to the shaft 3 by the steering wheel, the motors 10, 11 act in opposite directions on the wormwheel gear 4 to eliminate backlash. At higher levels of input torque applied to the shaft 3 by the steering wheel, the motors 10, 11 act in the same direction on the wormwheel gear 4 to assist in rotation of the shaft 3. Here, a motor 10, 11 acting in 'a direction' is used to indicate the direction of torque applied by a motor 10, 11 to the wormwheel gear 4.

In the exemplary arrangement shown in FIGS. 1 and 2, the worm gears 6, 7 engage diametrically opposed portions of a worm wheel gear 4. The threads of the worm gears 6, 7 each have the same sense, i.e., in this example, they are both left-handed screw threads. The motors 10, 11 are configured such that they lie on the same side of the wormwheel gear 4 (both motors 10, 11 lie on one side of a virtual plane perpendicular to axes of the worm gears 6, 7 and passing through the centre point of the wormwheel gear 4). Considering as an example the perspective shown in FIG. 2, driving both motors 10, 11 clockwise would apply torque in opposite directions to the wormwheel gear 4, with motor 10 applying a clockwise torque to wormwheel gear 4 and motor 11 applying an opposing anti-clockwise torque to wormwheel gear 4.

Figure 3:
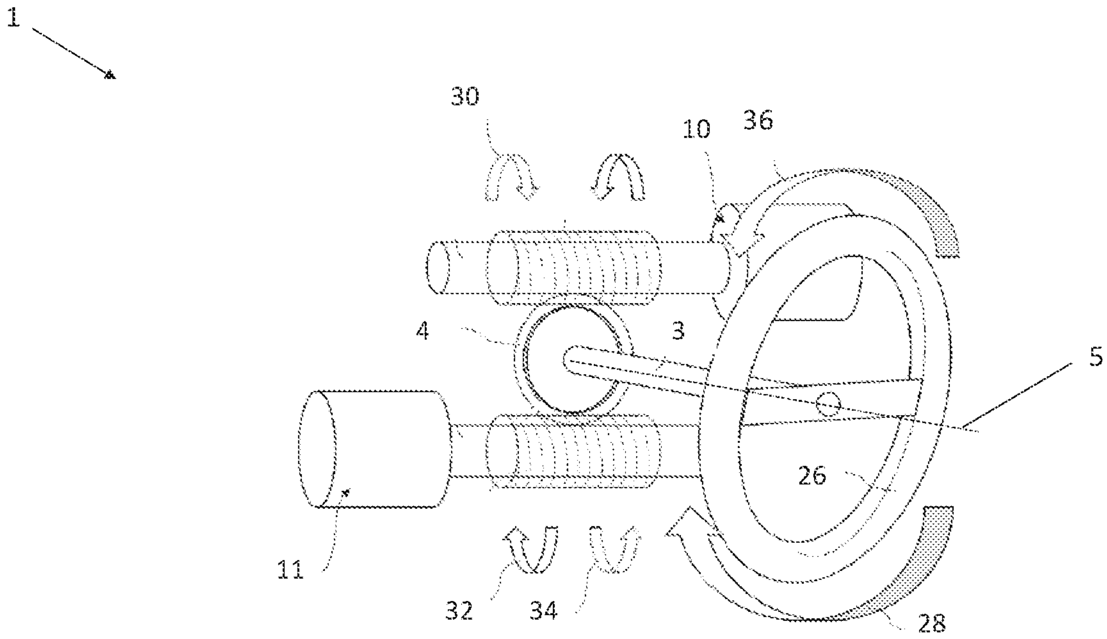
FIG. 3 shows another exemplary arrangement of a dual motor drive assembly according to a first aspect of the disclosure.

FIG. 3 shows another exemplary arrangement of a dual motor drive assembly, substantially similar to the arrangement shown in FIGS. 1 and 2 but with different motor positioning.

FIG. 3 shows another exemplary arrangement of a dual motor drive assembly 1 according to the first aspect of the disclosure. This arrangement is substantially similar to the arrangement shown in FIGS. 1 and 2 with the only difference being the positioning of the motors 10, 11. Components and functional units which in terms of function and/or construction are equivalent or identical to those of the preceding arrangement are provided with the same reference signs and are not separately described. The explanations pertaining to FIG. 1 and FIG. 2 therefore apply in analogous manner to FIG. 3 with the exception of the positioning of the two motors 10, 11.

In FIG. 3 the worm gears 6, 7 engage diametrically opposed portions of a wormwheel gear 4 and threads of the worm gears 6, 7 each have the same sense, i.e., they are both right-handed screw threads in this example. The motors 10, 11 are configured such that they lie on opposing sides of the wormwheel gear 4 (motor 10 lies on one side of a virtual plane perpendicular to axes of the worm gears 6, 7 and passing through the centre point of the wormwheel gear 4 while motor 11 lies on the other side of this virtual plane).

Application of torque by a driver in a clockwise direction indicated by solid arrow 28 results in rotation of the steering wheel 26 and the steering column shaft 3 about the dashed line 5. This rotation is detected by a rotation sensor (not shown). The first motor 10 is then controlled by the ECU 20 to apply torque in the opposite direction as indicated by dashed arrow 30.

The net result of the torques 30, 32, 34 applied by the first and second motors 10, 11 results in an application of a feedback torque to the steering column shaft 3 and steering wheel 26, as indicated by a dashed arrow 36, to provide a sensation of road feel to the driver. In this example, the application of a feedback torque is in the opposite direction to that applied to the steering wheel 26 by the driver. In this way, the "rattle" produced between the worm gears 6, 7 and the wormwheel gear 4 can be eliminated or significantly reduced.

Figure 4:
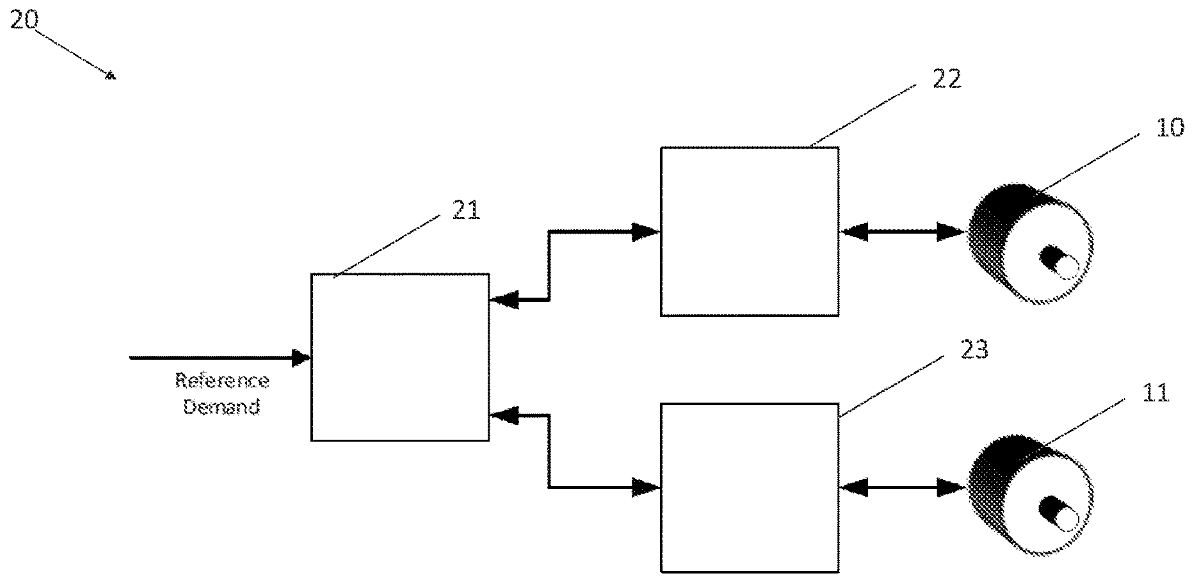
FIG. 4 shows a general arrangement of an electronic control unit which controls the two motors of a dual motor drive assembly according to a first aspect of the disclosure.

FIG. 4 shows part of an HWA assembly (80) showing a general arrangement of an electronic control unit (ECU) 20 which controls each of the two motors 10, 11. The ECU 20 may include a hand wheel actuator (HWA) control system 21 as well as a first and second motor controller 22, 23 which control the first and second motors 10, 11 respectively. A reference demand signal is input to the HWA control system 21 which allocates torque demands to each of the first and second motors 10, 11. These motor torque demands are converted to motor current demands and transmitted to the first and second motor controllers 22, 23. Each motor 10, 11 provides operating feedback to their respective motor controller 22, 23. The HWA control system 21 is configured to calculate the magnitude of mechanical friction using the motor torque demands. In another arrangement, the HWA control system 21 may be implemented by a separate ECU to the first and second motor controller 22, 23.

Figure 5:
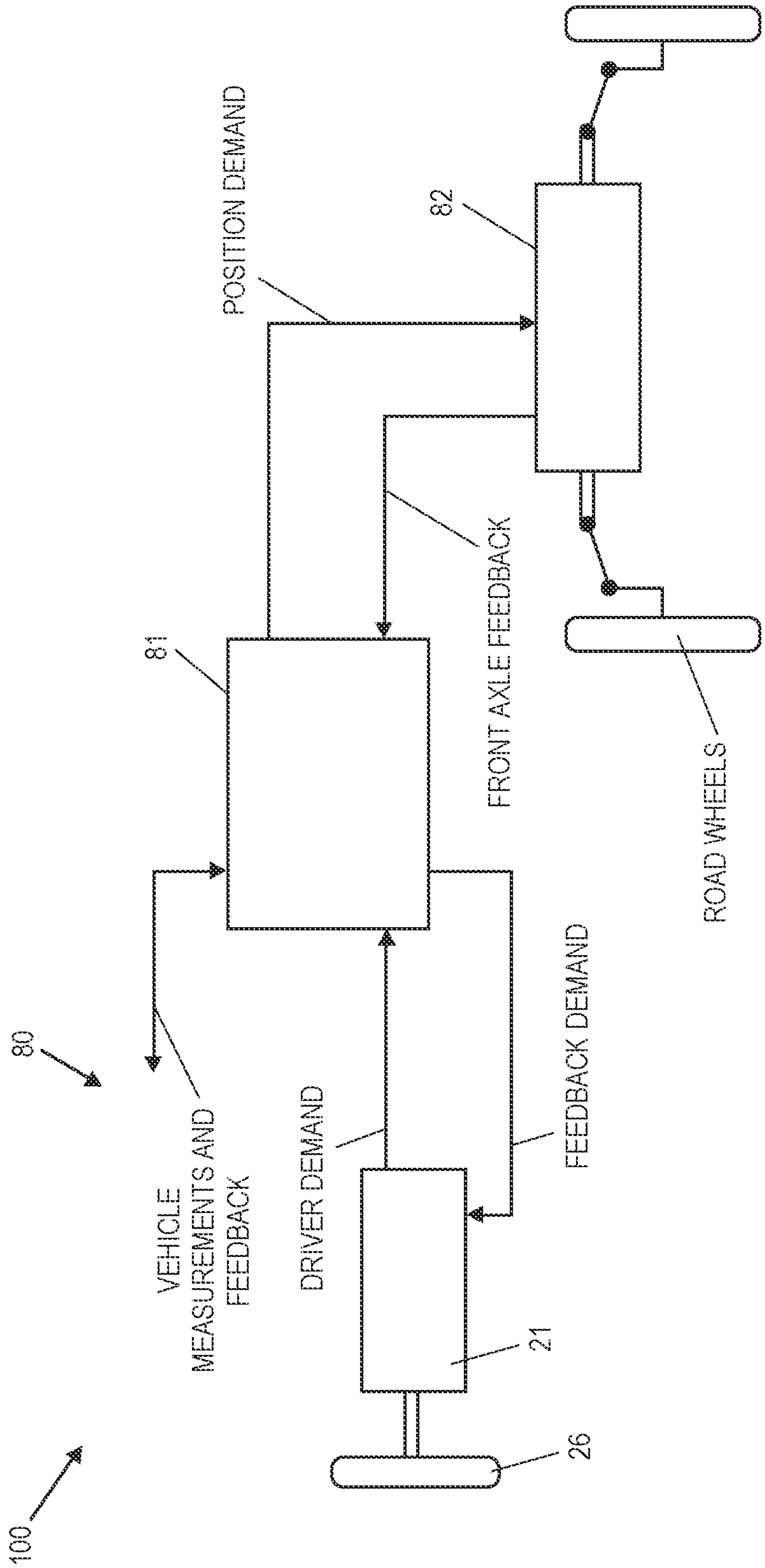
FIG. 5 shows a layout of a Steer-by-Wire system including a dual motor drive assembly according to a first aspect of the disclosure.

FIG. 5 shows an overall layout of a Steer-by-Wire system 100 for a vehicle including handwheel actuator (HWA) assembly 80 using a dual motor drive assembly 1 according to a first aspect of the disclosure. The HWA assembly 80 supports the driver's steering wheel 26 and measures the driver demand which is usually the steering angle. A steering controller 81 converts the driver demand into a position demand that is sent to a front axle actuator (FAA) 82. The FAA 82 controls the steering angle of the roadwheels to achieve the position demand. The FAA 82 can feedback operating states and measurements to the steering controller 81.

The steering controller 81 combines the FAA 82 feedback with other information measured in the vehicle, such as lateral acceleration, to determine a target feedback torque that should be sensed by a driver of the vehicle. This feedback demand is then sent to the HWA control system 21 and is provided by controlling the first and second motors 10, 11 with the first and second motor controllers 22, 23 respectively.

FIG. 5 shows the steering controller 81 as physically separate to both the HWA controller 21 and the FAA 82. Alternately, different architectures, where one or more of these components are physically interconnected, may be used within the scope of this disclosure. For example, the functions of the steering controller 81 may be physically implemented in the HWA controller 21, the FAA 82, or another control unit in the vehicle, or some combination of all 3. Alternatively, control functions ascribed to the HWA controller 21 and FAA 82 may be partially or totally implemented in the steering controller 81.

Figure 6:
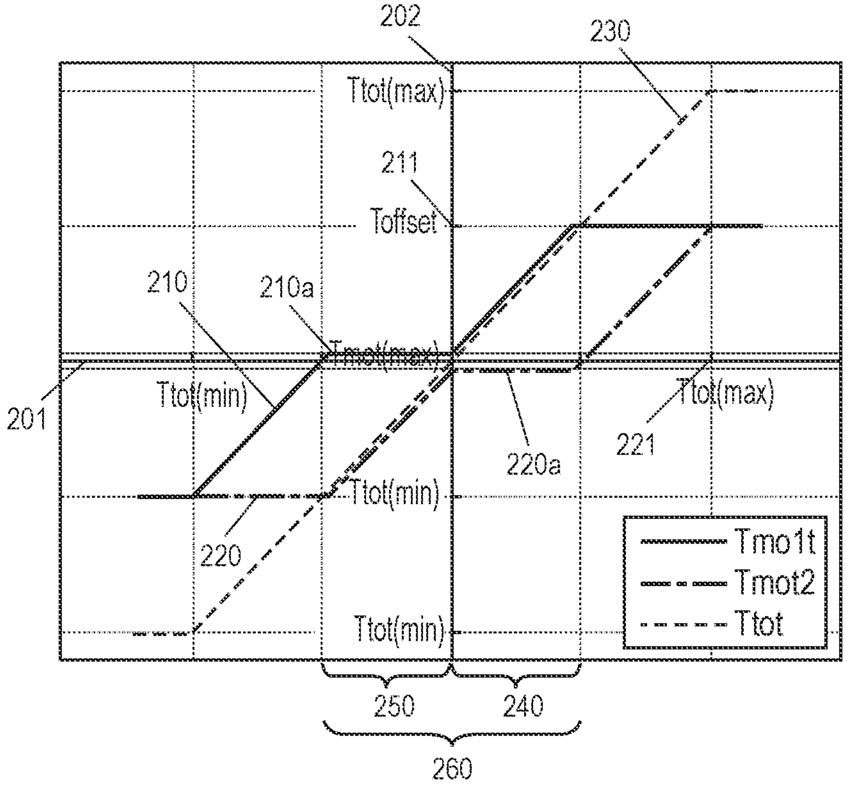
FIG. 6 shows a relationship between the feedback torque demanded and the feedback torque applied for a dual motor drive assembly according to a first aspect of the disclosure.

The relationship between the total torque demanded to provide feedback to the driver (x-axis) 201 and the feedback torque applied (y-axis) 202 for a dual motor drive assembly according to a first aspect of the disclosure is shown in FIG. 6.

The dual motor drive assembly 1 further comprises an allocation arrangement for allocating torque demands to each of the first and second motors 10, 11. A first profile 210, shown as a solid line in FIG. 6, defines a relationship between a total torque demanded for the shaft and the torque demand allocated to one of the first and second motors 10, 11. When the dual drive assembly 1 is allocating torque according to a first mode, the first profile 210 represents the torque applied by the first motor 10. A second profile 220, shown as a dot-dash line in FIG. 6, defines a different relationship between a total torque demanded for the shaft and the torque demand allocated to one of the first and second motors 10, 11. When the dual drive assembly 1 is allocating torque according to a first mode, the second profile 220 represents the torque applied by the second motor 11. The net torque applied by the two motors is represented by dashed line 230.

In a first torque range 240 where torque is positive, the first motor 10 applies a torque shown by profile 210 to provide feedback to the steering column shaft 3 and steering wheel 26, while the second motor 11 applies a smaller magnitude torque known as an "offset torque" in the opposite direction (shown by profile 210) to provide an "active" lock to eliminate or reduce transmission rattle. The roles of the motors change depending in which direction the driver is steering. In a second torque range 250 where the torque is negative, the second motor 110 applies a feedback torque 220 to the steering column shaft 3 and the first motor 10 applies a smaller magnitude "offset" torque in the opposite direction.

The offset torque 210*a* applied by the first motor 10 is indicated by the constant torque region located within the second torque range 250.

The offset torque 220*a* applied by the second motor 11 is indicated by the constant torque region located within the first torque range 240.

Together, the first torque range 240 and second torque range 250 extend across a low torque region 260.

It can be seen in FIG. 6 that as the total torque demanded increases from zero the first motor 10 provides an increasing applied torque 210 until a maximum output 211 for the first motor 10 is reached. As the total torque demanded further increases, the applied torque 220 provided by the second motor 11 increases such that both motors 10, 11 are applying a torque in the same direction (e.g., positive in the top right quadrant) to the first wormwheel gear 4. The net torque 230 applied by the two motors 10, 11 can be seen to increase at a constant rate from zero until a maximum output 221 for the second motor 11 is reached, at which point both the first and second motors have reached their maximum output torques 211, 221 and the net torque 230 plateaus.

In the low torque region 260 the torque allocating arrangement for allocating torque demands to each of the first and second motors 10, 11 is allocating torque to the first and second motors 10, 11 such that each output worm gear 6, 7 applies an opposing torque to the wormwheel gear 4, in order to control mechanical backlash.

FIG. 6 shows example torque values where one motor reaches its maximum torque output before the other motor cross over such that both motors are working together. In other examples, any torque profiles may be used. For example, the second motor may cross over to work with the first motor before the first motor reaches a maximum output torque, and vice versa. In this way, both motors spend less time at maximum output torque as higher total torques can be provided before a motor reaches maximum output torque. This in turn reduces losses and increases working life.

After a motor has crossed over to work with the other motor, as the total demanded torque increases the allocated torque demands may become equal. Both motor torques may become equal prior to either motor reaching a maximum output torque. The point at which the motors go from outputting different torque value to outputting an equal torque may be described as a blending point. For any demanded total torque above the blending point where the allocated torque demands become equal, the allocated torque demands to both motors may increase at an equal rate. In this way, there may be a torque range up to an including the maximum total torque where the torque demands to both motors are equal.

It is known for conventional dual motor drive assemblies to operate in a single mode. In contrast, the dual motor assembly 1 according to a first aspect of the disclosure is operable in both the first mode (as described above in relation to FIG. 6) and a second mode.

In the second mode, the torque allocated to each of the first and second motors is swapped. That is to say that in the second mode, the torque allocated to the first motor 10 follows the second profile 220 and the torque allocated to the second motor 11 follows the first profile 210.

Within the low torque region 260 when the allocation arrangement for allocating torque demands to each of the first and second motors 10, 11 allocates torque according to the second mode, each worm gear 6, 7 applies an opposing torque to the wormwheel gear 4.

Figure 7:
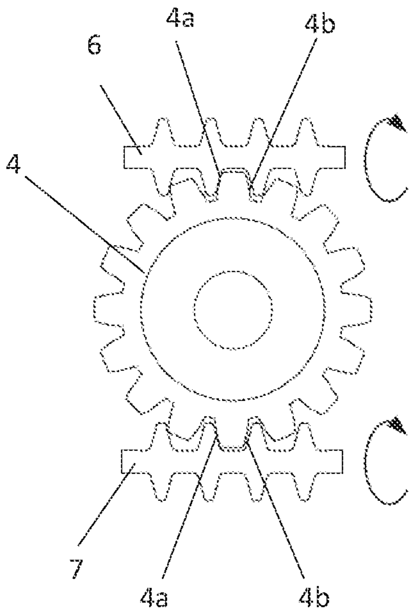
FIG. 7 shows an example relationship between a total torque demanded and the motor torques of the first and second motors.

FIG. 7 shows the interaction between the first worm 6, second worm 7 and the wormwheel gear 4 when the total demanded torque in the low torque region 260 and the allocation arrangement for allocating torque demands to each of the first and second motors 10, 11 is allocating torque according to the first mode.

In the first mode, the torque allocations to the motors 10, 11 mean the worm gears 6, 7 are configured to rotate clockwise and are applying opposing torques to the wormwheel gear 4. In this way, flanks 4*a* on the left-hand side of the wormwheel gear 4 as shown in FIG. 7 are in contact with the worm screws 6, 7 whilst flanks 4*b* on the opposing side of the same teeth are not. As a large proportion of the operating life is spent operating at near the straight-ahead position, the wormwheel flanks 4*a* of a few teeth will experience the most wear. This also applies to a few corresponding regions of the threads of the worm screws 6, 7.

Figure 8:
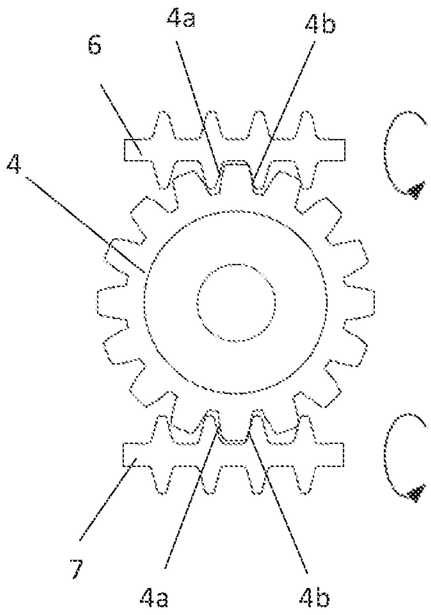
FIG. 8 shows another example relationship between a total torque demanded and the motor torques of the first and second motors.

FIG. 8 shows the interaction between the first worm 6, second worm 7 and the wormwheel gear 4 when the total demanded torque in the low torque region 260 and the torque allocation arrangement for allocating torque demands to each of the first and second motors 10, 11 is allocating torque according to the second mode.

In the second mode, the torque allocated to the first and second motors 10, 11 is in the opposing direction to the first mode as shown in FIG. 8. The flanks 4*b* on the right-hand side of the wormwheel gear 4 as shown in FIG. 8 are in contact with the worm screws 6, 7 whilst the flanks 4*a* on the opposing side of the same teeth are not.

Within the low torque region 260, the torque allocated to the first motor 10 in the first mode is in an opposing direction to the torque allocated to the first motor 10 in the second mode. Similarly, the torque allocated to the second motor 11 in the first mode is in an opposing direction to the torque allocated to the second motor 11 in the second mode. By providing a switching arrangement operable to switch the torque allocations between the first mode and the second mode the wear to the flanks 4*a*, 4*b* of the teeth of the wormwheel 4 may be more evenly distributed.

Figure 9:
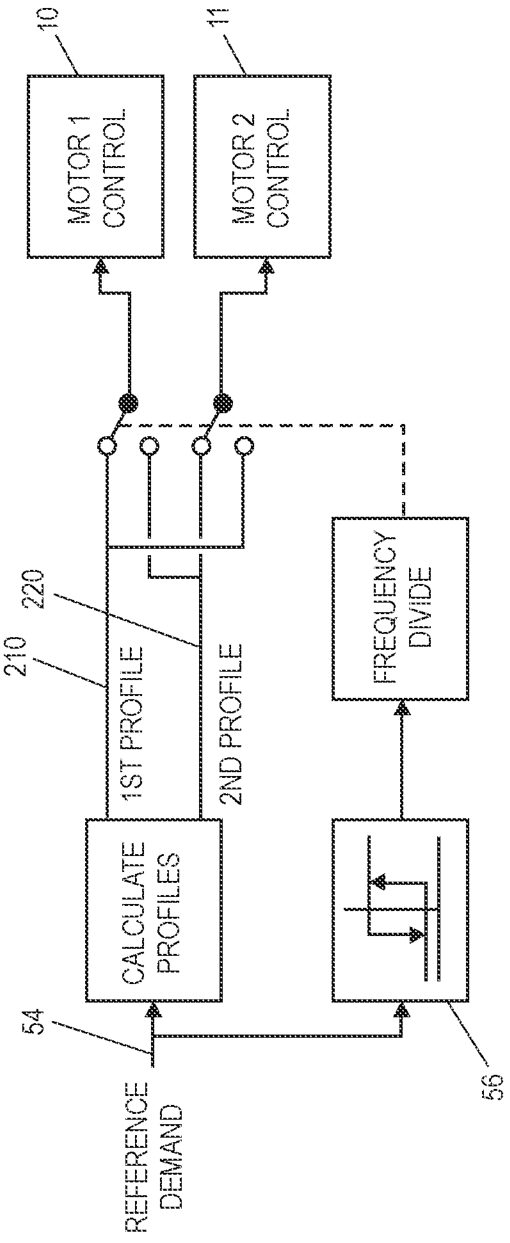
FIG. 9 shows another example relationship between a total torque demanded and the motor torques of the first and second motors.

FIG. 9 shows schematically an example control scheme to implement operation-based allocation mode switching.

In the example shown in FIG. 9, torque demands are allocated to the first and second motors 10, 11 according to either the first profile 210 or the second profile 220.

In an example, a total demanded torque 54 is used to calculate the two torque profiles 210, 220. A Schmitt trigger 56 is used to detect when the torque demand 54 exceeds a demand threshold. The threshold may be set at any value equal or greater than the point at which the output torque from the first and second motor 10, 11 is equal. At this blending point, the allocated torque demands may switch from the first profile 210 to the second profile 220, or vice versa. As the output torque from the first and second motor 10, 11 is equal, the switch is smooth.

Alternately, the threshold may be set at a value less than the point at which the output torque from the first and second motor 10, 11 is equal i.e., lower magnitude torque than the blending point. This would result in switching between profiles 210, 220 when their torques are not equal. In this example, the torque threshold may be selected such that the magnitude of the difference between the torque value of the first profile 210 and the value of the second profile 220 at this point is less than a pre-defined value. The pre-defined value may correspond to a torque difference at which the switching does not produce noticeable rattle or vibration through the shaft 3 (to a driver steering the steering wheel 26).

Figure 10:
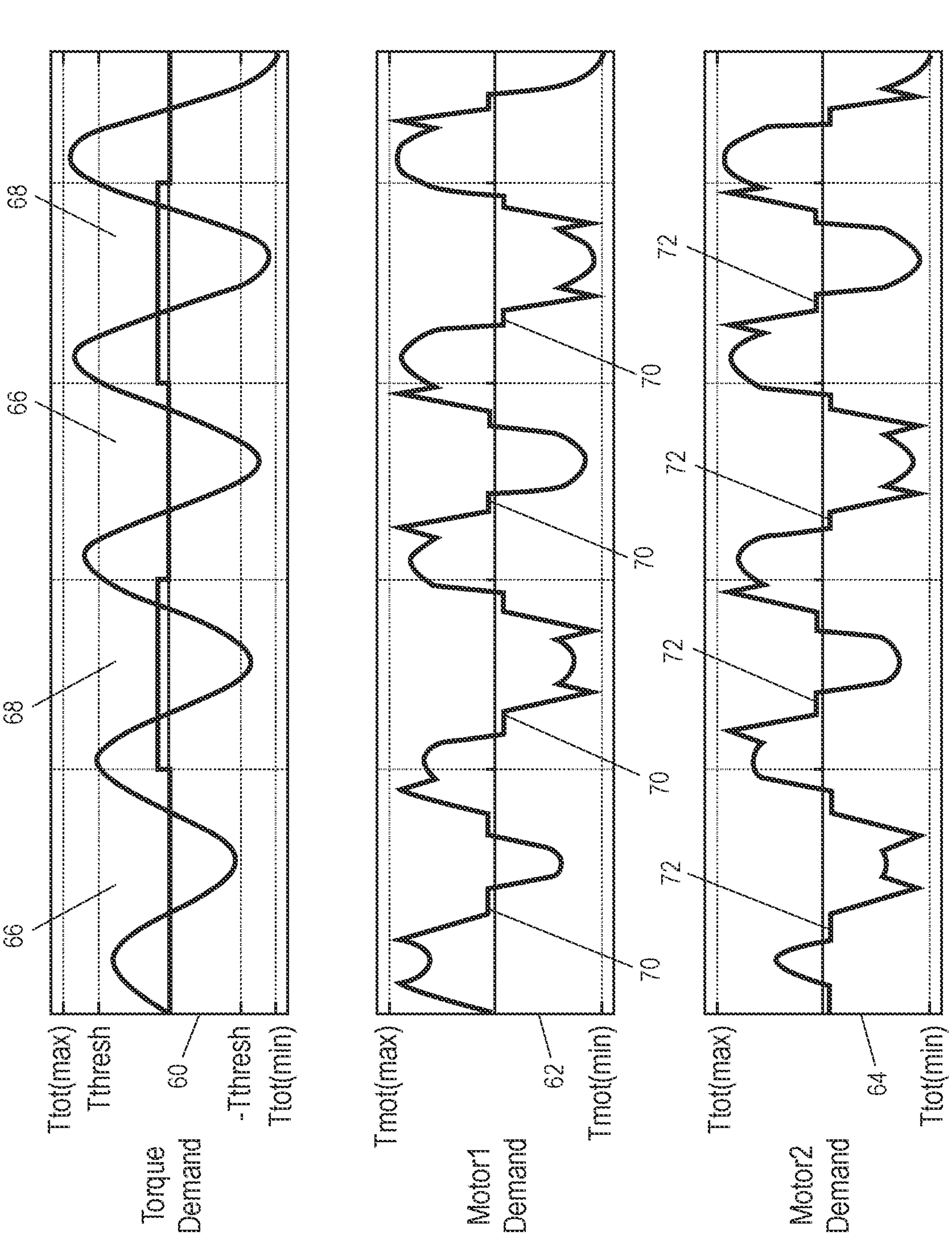
FIG. 10 shows another relationship between a total torque demanded and the motor torques of the first and second motors over time.

FIG. 10 shows an example of the first motor torque demand 62 and second motor torque demand 64 in relation to the total torque demand 60 over a period of time.

The time period is split into four segments, where in a first set of segments 66 the torque allocations are according to the first mode and in a second set of segments 68 the torque allocations are according the second mode.

As shown, the offset torque 70 of the first motor 10 switches from positive to negative as the torque allocation changes from the first mode to the second mode, and versa. The opposing switch can be seen in the offset torque 72 torque allocations for the second motor 11.

The term 'transient' may be defined as a temporary oscillation that occurs because of a sudden change of torque. The term 'noticeable' is use throughout this disclosure to mean that an artefact is perceptible to a driver of the vehicle while holding the steering wheel.

The first profile 210 and the second profile 220 are example profiles and it will be understood by those skilled in the art that many different profiles would be suitable to replace either or both the first and second profile. As such, different profiles not discussed in this disclosure may be implemented as either the first or second profile within the scope of the disclosure. The first profile cannot be identical to the second profile within the range of operating torques for the first and second motors.

Figure 11:
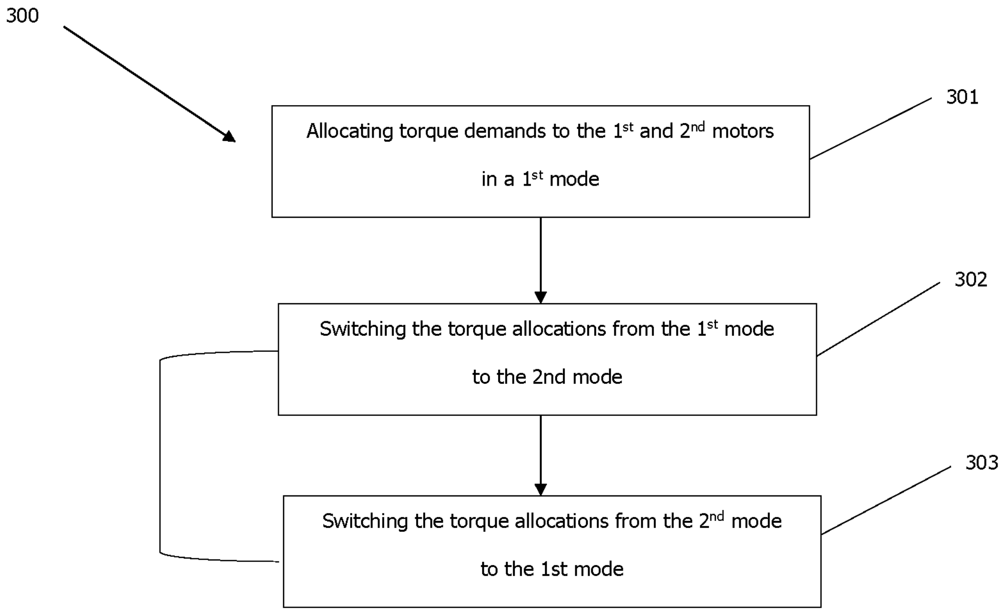
FIG. 11 shows a method of operating a dual motor drive assembly according to a second aspect of the disclosure.

FIG. 11 shows a method 300 of operating a dual motor drive assembly. The dual motor drive assembly comprises: a housing; a shaft rotatably mounted with respect to the housing and a first gear connected to and configured to rotate with the shaft. The dual motor drive assembly further comprises: a first and second motor, each having an output driving a respective output gear, the output gears being engaged with the first gear; and torque allocation arrangement for allocating torque demands to each of the first and second motors according to a first mode and a second mode. The dual motor drive assembly may be the dual motor drive assembly 1 according the first aspect of the disclosure (described in relation to FIGS. 1 to 10).

The method 300 comprises a first step 301 and a second step 302. The first step 301 involves allocating torque demands to the first and second motors in accordance with a first mode. In the first mode, the torque demand allocated to the first motor follows a first profile and the torque demand allocated to the second motor follows a second profile.

The second step 302 involves a switching arrangement switching the torque allocations from the first mode to the second mode. In the second mode, the torque demand allocated to the first motor follows the second profile and the torque demand allocated to the second motor follows the first profile.

The method 300 may further comprise a third step 303. The third step 303 involves the switching arrangement switching the torque allocations from the second mode to the first mode.

The method 300 may further comprise any number of additional steps similar to either the second step 302 or the third step 303.

It will be understood that the disclosure is not limited to the exemplary arrangements above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A dual motor drive assembly, for use in a handwheel actuator assembly of a vehicle, comprises:
- a housing;
- a shaft rotatably mounted with respect to the housing;
- a first gear connected to and configured to rotate with the shaft;
- first and second motors, each motor having an output driving a respective output gear, the output gears being engaged with the first gear;
- a torque allocation arrangement for allocating torque demands to each of the first and second motors according to a first mode and a second mode,
- wherein in the first mode the torque demand allocated to the first motor follows a first profile and the torque demand allocated to the second motor follows a second profile,
- wherein the first and second profiles represent defined relationships between a total torque demand and the torque demand allocated to one of the first and second motors,
- wherein in the second mode the torque demand allocated to the first motor follows the second profile and the torque demand allocated to the second motor follows the first profile,
- further comprising a switching arrangement operable to switch the torque allocations between the first mode and the second mode.

2. A dual motor drive assembly as claimed in claim 1 wherein the first gear comprises a wormwheel, the first motor is operably connected to a first worm, the second motor is connected to a second worm and the wormwheel is operatively connected to a driver's steering wheel via the shaft.

3. A dual motor drive assembly as claimed in claim 1, wherein the switching arrangement comprises an electronic control unit.

4. A dual motor drive assembly as claimed in claim 1, wherein the switching arrangement is configured to switch the torque allocations between the first mode and the second mode, and vice versa, after operating for a pre-determined period.

5. A dual motor drive assembly as claimed in claim 4 wherein the period is a fixed or randomised time period.

6. A dual motor drive assembly as claimed in claim 4 wherein the period is determined by an amount of operation, including an angular distance travelled by the steering wheel or a distance travelled by the vehicle.

7. A dual motor drive assembly as claimed in claim 1, wherein the switching arrangement is configured to switch the torque allocations between the first mode and the second mode, and vice versa, when the dual motor drive assembly is powered-up at a start of a journey.

8. A dual motor drive assembly as claimed in claim 7 wherein the torque allocations may be switched after a fixed number of journeys.

9. A dual motor drive assembly as claimed in claim 3, wherein the electronic control unit includes a non-volatile memory that is operable to store the torque allocation to be used for the next journey.

10. A dual motor drive assembly as claimed in claim 9 wherein when a journey is started, the current allocation is read from the non-volatile memory.

11. A dual motor drive assembly as claimed in claim 10 wherein the allocation mode stored in the non-volatile memory is swapped to an alternate allocation mode ready for the next journey or powering up of the dual motor drive assembly.

12. A dual motor drive assembly as claimed in claim 1, wherein the switching arrangement is configured to switch the torque allocations between the first mode and the second mode, and vice versa, when the motors are both operating in the same direction.

13. A dual motor drive assembly as claimed in claim 1, wherein the switching arrangement is configured to switch the torque allocations between the first mode and the second mode, and vice versa, when the motors are both operating in the same direction and providing an equal torque output.

14. A dual motor drive assembly as claimed in claim 1, wherein a Schmitt trigger is used to detect when the torque demand exceeds a demand threshold, where the threshold is set at value equal or greater than the point at which the output torque from the first and second motor is equal, and at this threshold the allocated torques switches from the first mode to the second mode.

15. A method of operating a dual motor drive assembly, the dual motor drive assembly comprising:

a housing;

a shaft rotatably mounted with respect to the housing;

a first gear connected to and configured to rotate with the shaft;

first and second motors, each having an output driving a respective output gear, the output gears being engaged with the first gear; and a torque allocation arrangement for allocating torque demands to each of the first and second motors according to a first mode and a second mode wherein the method comprises the steps:

allocating torque demands to the first and second motors in accordance with a first mode wherein the torque demand allocated to the first motor follows a first profile and the torque demand allocated to the second motor follows a second profile using a switching arrangement to switch the torque allocations from the first mode to the second mode, wherein in the second mode the torque demand allocated to the first motor follows the second profile and the torque demand allocated to the second motor follows the first profile.

16. A method according to claim 15 wherein the switching arrangement switches the torque allocations between the first mode and the second mode, and vice versa, after operating for a pre-determined period.

17. A method according to claim 15 wherein the switching arrangement switches the torque allocations between the first mode and the second mode, and vice versa, when the dual motor drive assembly is powered-up at the start of a journey.

18. A method according to claim 15, wherein the switching arrangement switches the torque allocations between the first mode and the second mode, or vice versa, when the motors are both operating in the same direction.

19. A method according to claim 16 wherein the switching arrangement switches the torque allocations between the first mode and the second mode, and vice versa, when the dual motor drive assembly is powered-up at the start of a journey.

20. A method according to claim 19, wherein the switching arrangement switches the torque allocations between the first mode and the second mode, or vice versa, when the motors are both operating in the same direction.

* * * * *